US009146554B2

(12) United States Patent
Hoban

(10) Patent No.: US 9,146,554 B2
(45) Date of Patent: Sep. 29, 2015

(54) AGGREGATE PROCESSING CONTROL SYSTEM

(71) Applicant: OKANAGAN QUALITY CONTROL LTD., Salmon Arm (CA)

(72) Inventor: Adam Hoban, Salmon Arm (CA)

(73) Assignee: Adam Hoban (CA)

( * ) Notice: Subject to any disclaimer, the term of this patent is extended or adjusted under 35 U.S.C. 154(b) by 528 days.

(21) Appl. No.: 13/653,250

(22) Filed: Oct. 16, 2012

(65) Prior Publication Data

US 2014/0108182 A1   Apr. 17, 2014

(51) Int. Cl.
| B07B 13/18 | (2006.01) |
| G05B 19/418 | (2006.01) |
| G06Q 10/06 | (2012.01) |
| B02C 25/00 | (2006.01) |

(52) U.S. Cl.
CPC .......... *G05B 19/41815* (2013.01); *B07B 13/18* (2013.01); *G05B 19/41875* (2013.01); *G06Q 10/06* (2013.01); *B02C 25/00* (2013.01); *B07B 2201/04* (2013.01)

(58) Field of Classification Search
CPC .... B07B 13/18; B07B 2201/04; B02C 25/00; G05B 15/02; G05B 19/41815; G05B 19/41875
USPC ................... 209/237; 700/108, 109
See application file for complete search history.

(56) References Cited

U.S. PATENT DOCUMENTS

| 3,741,532 A * | 6/1973 | Farnham et al. ................. 366/7 |
| 4,026,479 A * | 5/1977 | Bradburn et al. ............. 241/30 |
| 4,516,212 A | 5/1985 | Nagashima |
| 4,544,102 A * | 10/1985 | Hahn et al. ................ 241/24.11 |
| 5,222,605 A * | 6/1993 | Pogue ......................... 209/239 |
| 5,519,298 A * | 5/1996 | Fukuhara et al. ............ 318/611 |
| 6,311,847 B1 * | 11/2001 | Soldwish-Zoole et al. ... 209/156 |
| 6,343,234 B1 * | 1/2002 | Thomas ........................ 700/28 |
| 6,343,237 B1 | 1/2002 | Rossow et al. |
| 6,581,780 B1 * | 6/2003 | Jakob et al. .................. 209/239 |
| 7,308,614 B2 | 12/2007 | Kojori |
| 7,322,536 B2 | 1/2008 | Garvin et al. |
| 8,770,501 B2 * | 7/2014 | Laukka et al. ................. 241/29 |
| 8,909,360 B2 * | 12/2014 | Blevins et al. ................ 700/54 |
| 2002/0087245 A1 | 7/2002 | Rossow et al. |
| 2010/0091103 A1 * | 4/2010 | Peltonen et al. ............. 348/82 |
| 2010/0286798 A1 * | 11/2010 | Keyes et al. .................. 700/29 |
| 2011/0089270 A1 * | 4/2011 | Juha et al. ..................... 241/25 |
| 2014/0336788 A1 * | 11/2014 | Paunonen et al. ............. 700/29 |

* cited by examiner

*Primary Examiner* — Joseph C Rodriguez
(74) *Attorney, Agent, or Firm* — Antony C Edwards

(57) ABSTRACT

An aggregate processing plant for processing aggregate to a pre-determined specification within a particular gravel pit may include: a feed hopper, at least a first screen plant having a corresponding configuration and cooperating with the feed hopper, a first conveyor set cooperating with the first screen plant for conveying screened aggregate from the first screen plant, a first aggregate processing cooperating with the first conveyor set and downstream of the screen plant in a direction of flow of the screened aggregate on the first conveyor.

11 Claims, 13 Drawing Sheets

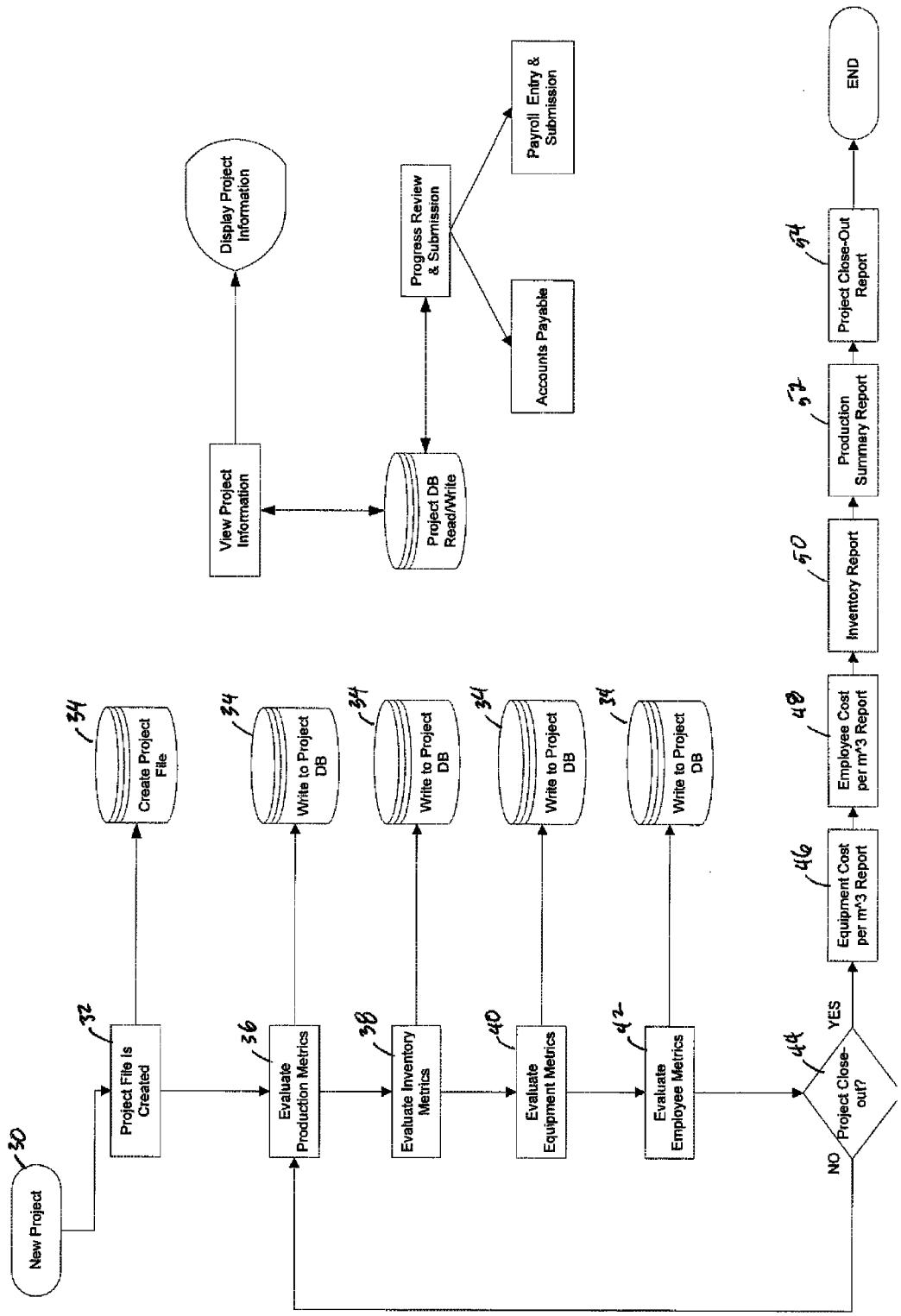

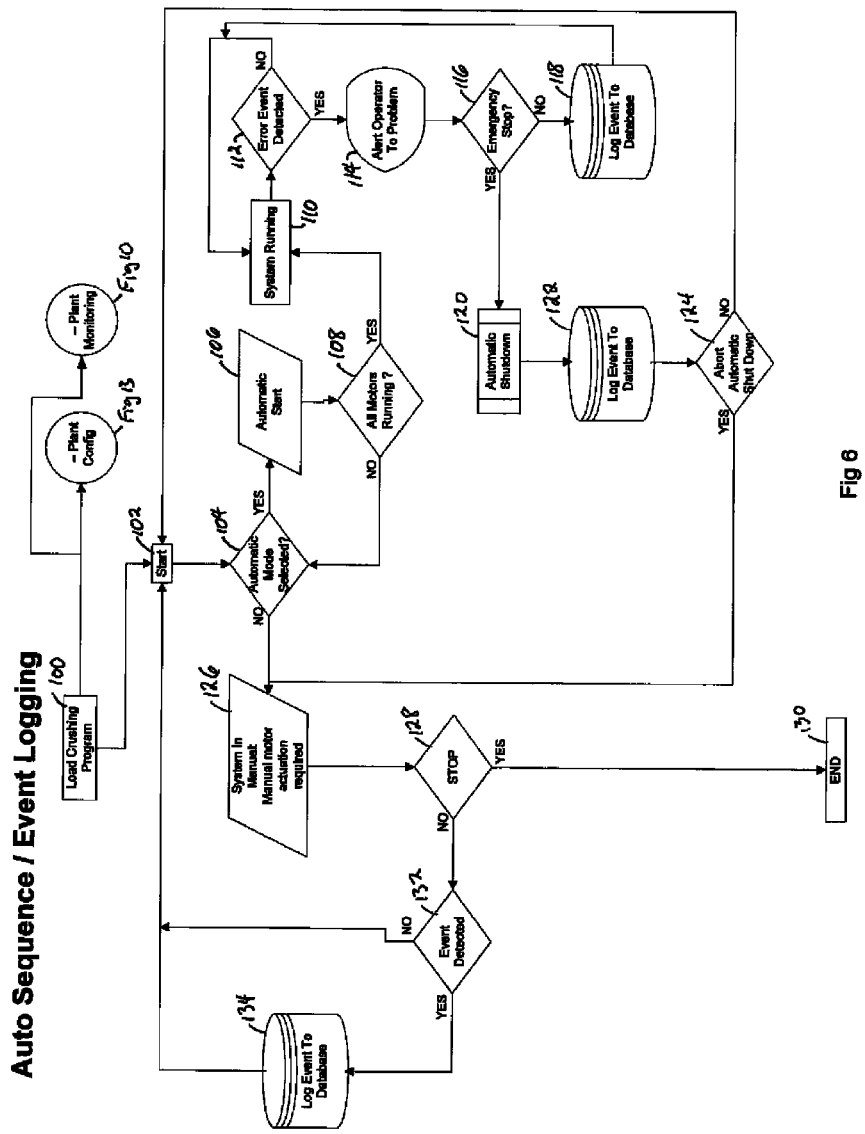

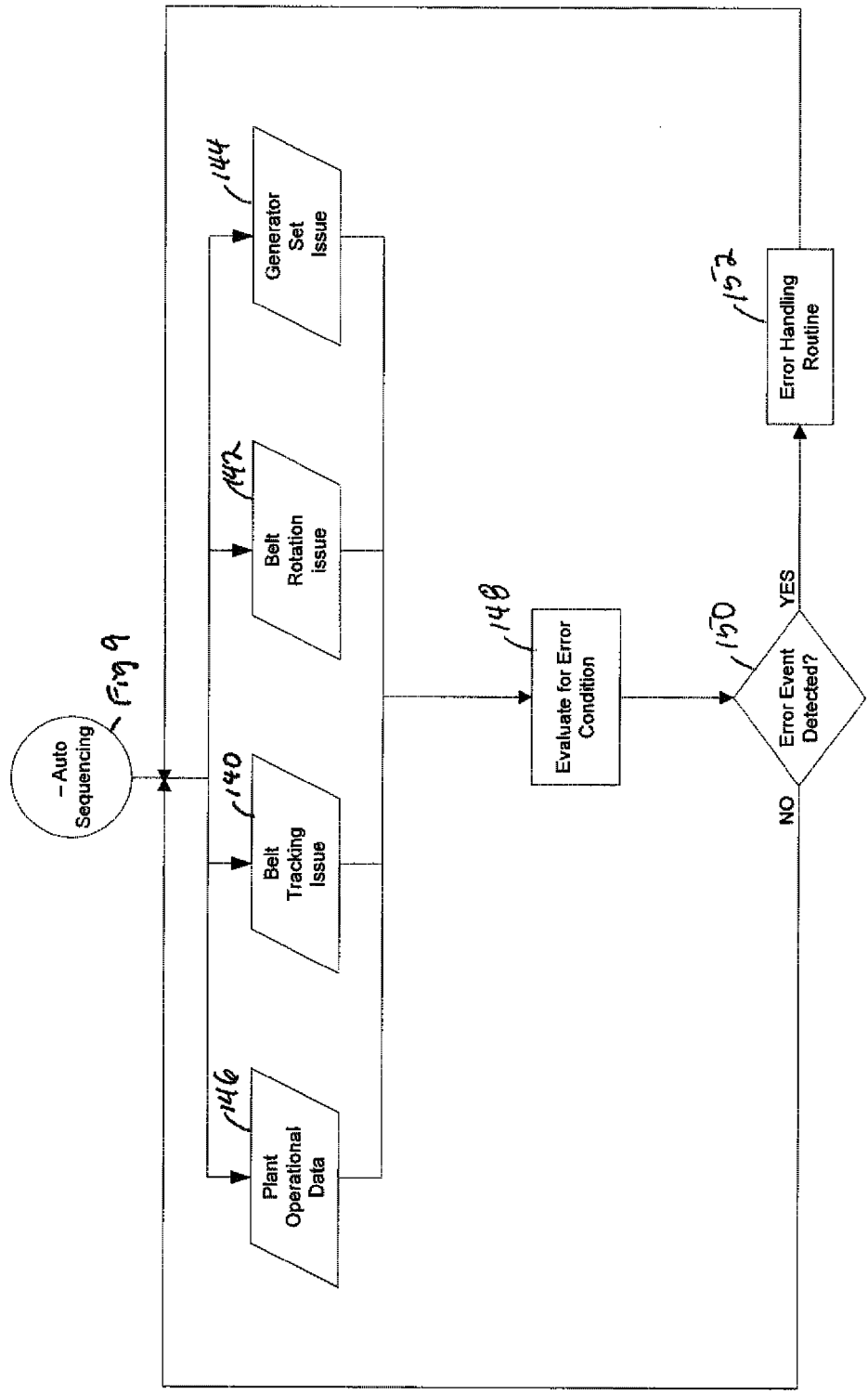

Maintenance Tracking

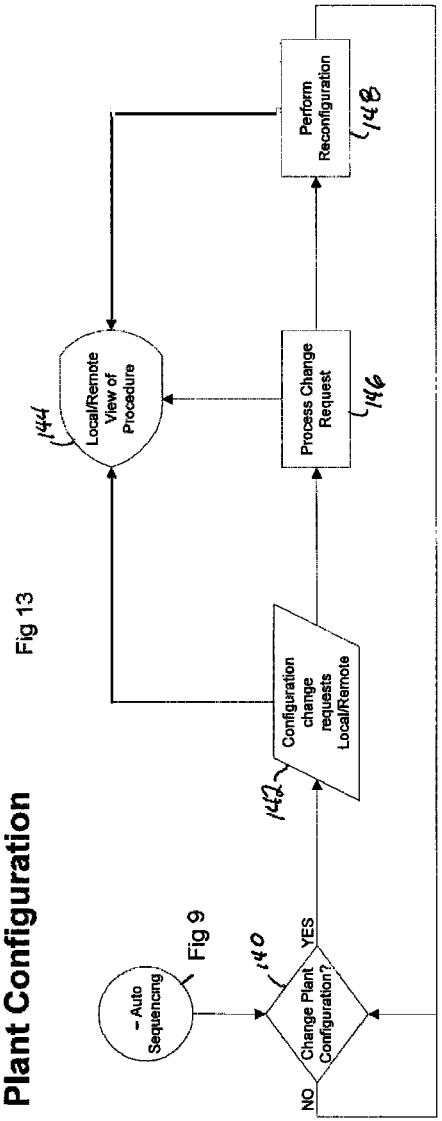

AGGREGATE PROCESSING CONTROL SYSTEM

BACKGROUND OF THE INVENTION

In the prior art applicant is aware of U.S. Pat. No. 7,322,536 which issued Jan. 29, 2008, for the Control System of Garvin et al.

Garvin describes a control system for a rock crusher which is adapted for use with a vertical shaft impact rock crusher which divides a rock it processes into a stream which is supplied to a central rotor and a stream which cascades past the rotor. The control system is used to control the ratio of material placed into the cascade and includes a processor which receives a throughput signal from at least one throughput sensor. The processor transmits at least one control signal to at least one control mechanism of the crusher, and at least one control signal or signals are transmitted to the control mechanism or mechanisms to adjust the amount of material entering the crusher rotor to provide a specific cascade ratio for the crusher in response to a variable throughput of material.

A throughput sensor is employed by the control system and its programmable logic controller. The control system may also be adapted to receive power consumption signals from drive elements or motors associated with the crusher, for example, a motor current value for electric motors used to drive the crusher rotor may be received by the control system. The control system monitors the power consumed by the drive motors and adjusts the settings of the control mechanisms of the crusher to ensure optimum efficiency and safe use of the crusher.

SUMMARY OF THE INVENTION

The aggregate processing control system according to one aspect of the present invention may be characterized as including a start-up, shut-down, emergency shut-down, and various other control options operated by software residing in a processor wherein the software provides some or all of service module reports, production reports on daily, weekly and/or monthly schedules, quality control reports, payable reports, employee time reports, screen configuration reports, and includes warning systems for detecting deviation of, or errors in, conveyor belt tracking or conveyor belt damage so as to provide warning that repairs are required, through the operation of remotely monitored sensors cooperating with the control system software, and to provide staged shut-down if necessary.

In summary, the present invention may be characterized in one aspect as a method of operating an aggregate processing plant, and in a further aspect as the plant itself, and in a further aspect as the control system for the processing plant and for the method, in order to provide aggregate to a pre-determined specification within a particular gravel pit. The method may include the steps of
within the particular gravel pit:
a) providing a feed hopper,
b) providing at least a first screen plant having a corresponding configuration and cooperating with the feed hopper,
c) providing a first conveyor set cooperating with the first screen plant for conveying screened aggregate from the first screen plant,
d) providing a first aggregate processor cooperating with the first conveyor set and downstream of the screen plant in a direction of flow of the screened aggregate on the first conveyor.

The first screen plant advantageously has a multi-layer screen deck having removable screens from each layer of the screen deck. Each screen in each layer has a corresponding screen or screen aperture size for separating screened aggregate based on the aperture size. The screens and corresponding aperture sizes in the screen deck provide at least part of the configuration of the first screen plant.

The method also advantageously includes:
e) providing conveyor sensors cooperating with the first conveyor set for detecting at least one of: conveyor velocity, conveyor mis-alignment, conveyor damage, conveyor blockage,
f) providing a processor and a control system, wherein the processor includes computing means, a programmable logic controller (PLC), and data storage. The control system cooperates with, so as to regulate operation of and inter-operability between, the feed hopper, the first conveyor set, the first screen plant, and the first aggregate processor. The control system communicates with the sensors and with the processor for operation of the aggregate processing plant to optimize through-put of screened and aggregate, and records the throughput as throughput data and the specification as specification data in the data storage.

The control system may also advantageously include a quality control method comprising the further steps of:
g) obtaining a sample of the screened and aggregate from downstream of the first aggregate processor,
h) performing sieve testing of the sample to obtain corresponding test results,
i) comparing the test results to the specification to determine any deviation from the specification,
j) then, if the deviation falls outside of an acceptable deviation-from-specification range, adjusting the configuration of the first screen plant,
k) repeating steps g)-j) until the deviation falls within the acceptable deviation-from-specification range,
l) recording the corresponding configuration of the first screen plant as configuration data in the data storage for later retrieval of at least corresponding the throughput, specification and configuration data upon a subsequent operation of the method in the particular gravel pit.

The method may further include the steps of:
a) receiving a request to submit a bid on a proposed roadwork in a particular location, wherein the roadwork requires aggregate according to a particular specification,
b) locating the data from the data storage of a proximate gravel pit which is proximate to the particular location of the proposed roadwork, wherein the proximate gravel pit is one of the particular gravel pits having the data in the data storage, and wherein the particular specification corresponds to the specification data in the data storage associated with the particular gravel pit,
c) using the throughput, specification and configuration data to formulate the bid for the proposed roadwork.

The aggregate processing plant according to one aspect of the present invention, for processing aggregate to a pre-determined specification within a particular gravel pit, may include:
a) a feed hopper,
b) at least a first screen plant having a corresponding configuration and cooperating with the feed hopper, c) a first conveyor set cooperating with the first screen plant for conveying screened aggregate from the first screen plant, d) a first aggregate processing cooperating with the first conveyor set and downstream of the screen plant in a direction of flow of the screened aggregate on the first conveyor, The first screen plant may have a multi-layer screen deck having removable screens from each layer of the screen deck. Each screen in each layer has a corresponding screen aperture size for separating the screened aggregate based on the aperture size, the screens and corresponding aperture sizes in the screen deck providing the configuration of the first screen plant.

The processing plant may also include:

e) conveyor sensors cooperating with the first conveyor set for detecting at least one of: conveyor velocity, conveyor mis-alignment, conveyor damage, conveyor blockage, f) a processor and a control system, wherein the processor includes computing means for example one or more computers, a PLC, and data storage for writing to and reading data from one or more databases maintained therein, and wherein the control system cooperates with, so as to regulate operation of and inter-operability between, the feed hopper, the first conveyor set, the first screen plant, and the first aggregate processor. The control system communicates with the sensors and with the processor for optimized operation of the aggregate processing plant to optimize through-put of screened and aggregate, and records the throughput as throughput data and the specification as specification data in the data storage.

The control system according to one aspect of the present invention may include a quality control module including a program or program modules for:

g) comparing test results from sieve testing of a sample of the screened and aggregate from downstream of the first aggregate processor, to the specification to determine any deviation from the specification, h) then, if the deviation falls outside of an acceptable deviation-from-specification range, prompting adjusting the configuration of the first screen plant, i) prompting repeating steps g)-h) until the deviation falls within the acceptable deviation-from-specification range, j) recording the corresponding configuration of the first screen plant as configuration data in the data storage for later retrieval of at least corresponding the throughput, specification, and configuration data upon a subsequent operation of the plant in the particular gravel pit.

The control system may also include an emergency staged shutdown which, upon detection of emergency conditions by the sensors, stages an automatic shutdown of at least the conveyors and the first aggregate processor to minimize damage and backup of the flow of the aggregate.

The method may further include providing a second screen plant, a second conveyor set, and a second aggregate processor cooperating with one another and with the first screen plant, the first conveyor set, and the first aggregate processor to provide the aggregate which is of a finer size than from the first aggregate processor. The control system may monitor the sensors and upon detection of at least one fault by the sensors commences the staged shutdown. The control system may also monitor and evaluate metrics chosen from the group of metrics comprising: production metrics, inventory metrics, equipment metrics, employee metrics. The control system may also produce reports chosen from the group of reports which includes: equipment and equipment consumable cost per cubic meter of the aggregate produced, employee cost per cubic meter of the aggregate product, a production summary.

BRIEF DESCRIPTION OF THE DRAWINGS

In the drawings which form part of the specification hereto, similar characters of reference denote corresponding parts in each view, wherein:

FIG. 5 is a diagrammatic logic flowchart of a project tracking module of the control system program according to one aspect of the present invention.

FIG. 6 is a diagrammatic logic flowchart of an auto sequence/event logging module of the control system program.

FIG. 7 is a diagrammatic logic flowchart of an automatic monitoring and control module of the control system program.

FIG. 12b is a diagrammatic logic flowchart of a further aspect of the quality control module of FIG. 12a.

FIG. 13 is a diagrammatic logic flowchart of a plant configuration module of the control system program.

FIG. 14b is a diagrammatic logic flowchart of a further aspect of the safety monitor module of FIG. 14a.

Figure 1:
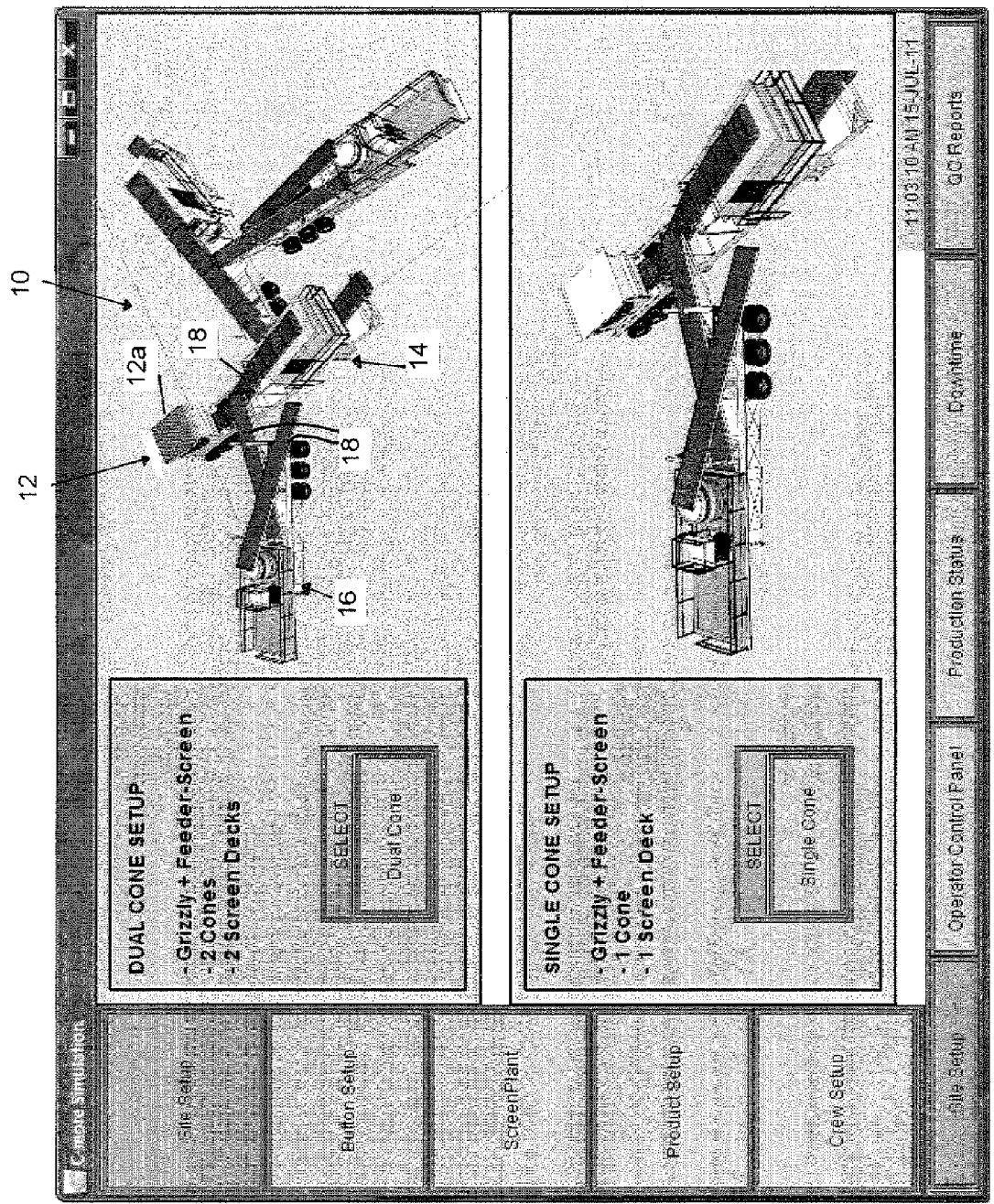
FIG. 1 is a depiction of a user interface, namely, the site setup screen depicting for an operator of the aggregate processing plant and method according to the present invention the available site setup options.

DETAILED DESCRIPTION OF EMBODIMENTS
OF THE INVENTION

In today's competitive economic environment, it is difficult to competitively bid on and deliver aggregate according to a particular job specification, for example road crush for the building of roads, and make a profit so as to remain in business. One of the factors making bidding and delivery of aggregate difficult is that quite often there is only a short time frame, for example 3 to 4 weeks, of notice given for when a particular bid on a particular job must be delivered. Within that time frame, the business providing the aggregate must determine all of the cost variables including the location of and available source of aggregate product within gravel pits local to the job, and the machine and man-power requirements to deliver the aggregate to specification within the volume and time frame required, knowing that many factors such as human resources, wear-and-tear on equipment, maintenance and repair costs, weather effecting production rates, and other factors remain highly variable. In applicant's opinion, if the delivery of end aggregate product may be delivered from a system which is vertically integrated, and employing a control system such as described herein, the effects of such variables may be reduced to thereby increase the likelihood of meeting volume, specification, and time frame targets so as to allow competitive bidding and in turn provide for a profit to the business.

Applicant has determined that at least the following overall essentials should be the subject of monitoring and automation such as provided herein; namely, production tracking, quality control, and emergency shutdown procedures (so as to for example prevent a particular conveyor belt in the production system from ripping which thereby saves costly downtime and may amount to savings in the range of ten-fifty thousand dollars), and finally, without intending to be limiting, fuel usage tracking, to name only a few. Thus the control system according to the present invention, may provide for decreased maintenance and downtime, and the aggregate processor system also thereby providing for monitoring of costs on a day-by-day basis and the cost per cubic meter of aggregate which has been processed to specification. It should be kept in mind that downtime is especially costly when quite often on aggregate processor plant will be operation 24 hours a day, 7 days a week.

As will be known to one skilled in the art, gravel pit aggregate processing and screening equipment such as provided by Elrus Aggregate Systems™ are mobile pieces of machinery which may be transported by road to a particular gravel pit location for use on a particular job. In applicant's experience, each particular gravel pit has a unique makeup of source material. It is conventional that screening and aggregate processor systems have to be configured relying on the experience of the operator to tailor aggregate processor and screening system for the particular demands of a particular gravel pit. It is therefore advantageous, and in one aspect may be delivered by the control system described herein, to maintain a historical record of how a particular aggregate specification was obtained for a particular gravel pit, which may then form an on-going database of such information for later use on later jobs when the portable aggregate processing and screening machinery is once again returned to a particular gravel pit. In such an instance, the operator may then call up the historical records for that gravel pit to assist in most efficiently configuring the system to avoid for any errors made in the past and to maximize the production and minimize the downtime.

Thus for example an aggregate processing and screening system 10 may employ, without intending to be limiting, a feed hopper 12 having thereon a first screen 12a having a large screen size (for example 8 inch), and the following machinery for example supplied by Elrus Aggregate Systems as would be known to one skilled in the art: a 6'×20', three deck feeder screen plant 14, a 6'×20', three deck screen, and a cone plant 16 such as a CH440 cone plant, which may be a two inch cone plant. To provide for monitoring of the conveyor belts 18 used in such Elrus Aggregate Systems plants, sensors (not shown) as would be known to one skilled in the art, such as, but not limited to, the following sensors supplied by Sandvik™ may be employed: belt misalignment switch models ES20 or ES21, a belt rotation detector model ES10, belt tearing detector models ES60 or ES61, a blockage detector model ES50, and a level limit switch model ES40. A speed sensor such as supplied by Milltronics™, and supplied under the acronyms RBSS and TASS may also be advantageously employed. A second stage screening and cone plant may also be employed for example to provide fine or one inch processed aggregate.

The belt misalignment switch gives a warning and/or stops a belt conveyor when the belt has moved sideways out of its normal alignment so as to risk damage to the belt or nearby structures. The switch is normally used with the upper belt but may also be used with the return belt in, for example, unstable conditions on long conveyors. The belt rotation detector stops the belt conveyor when the speed of the conveyor lowers below a predetermined minimum speed as is usually caused by disturbances in operation conditions so that the conveyor should be stopped to clear the disturbance. The belt tearing detector is intended to protect the conveyor belt in the conveyor system, and so as to prevent greater belt damage upon detection of smaller damage such as a tear having occurred in a belt. The belt tearing detectors are activated by small belt damage, for example, a tear caused by a block or a metal object for example. The detection of a tear by of the belt tearing detector results in a message being sent to the control system and the conveyor being stopped, which according to the present system, would be an automatic, staged shutdown in the event of belt damage being detected or in the event for example of blockages or buildups on the belts being detected. The blockage detector detects blockages on the conveyor system by detecting material pressing against the sensor. The level limit switch detects when an upper limit of accumulating material such as accumulating aggregate, occurs which may be caused by blockages or jams on the conveyors and discharge chutes. The level limit switch may include a gravity aligned arm which, upon over-limit levels, is deflected so as to activate a microswitch, for example, a ball-operated microswitch upon the rod reaching an inclination of for example 17° from vertical. The switch upon activation informs the control system of the occurrence of a level limit being reached or blockage as the case may be. The speed sensors may be mounted to the conveyor frame so as to maintain contact with the return belt to thereby determine belt speed as a wheel on the speed sensor rides on the upper surface on the return belt.

In addition to the above mentioned sensors, which again, is not intended to be limiting, and all of which cooperate with the control system better described below, the motors (not shown) of the feeder, screen, and cone plants are also monitored and tracked in order to determine in advance when problems in operation may be occurring, such as blockages, and to assist in determining when maintenance will be required.

Figure 2:
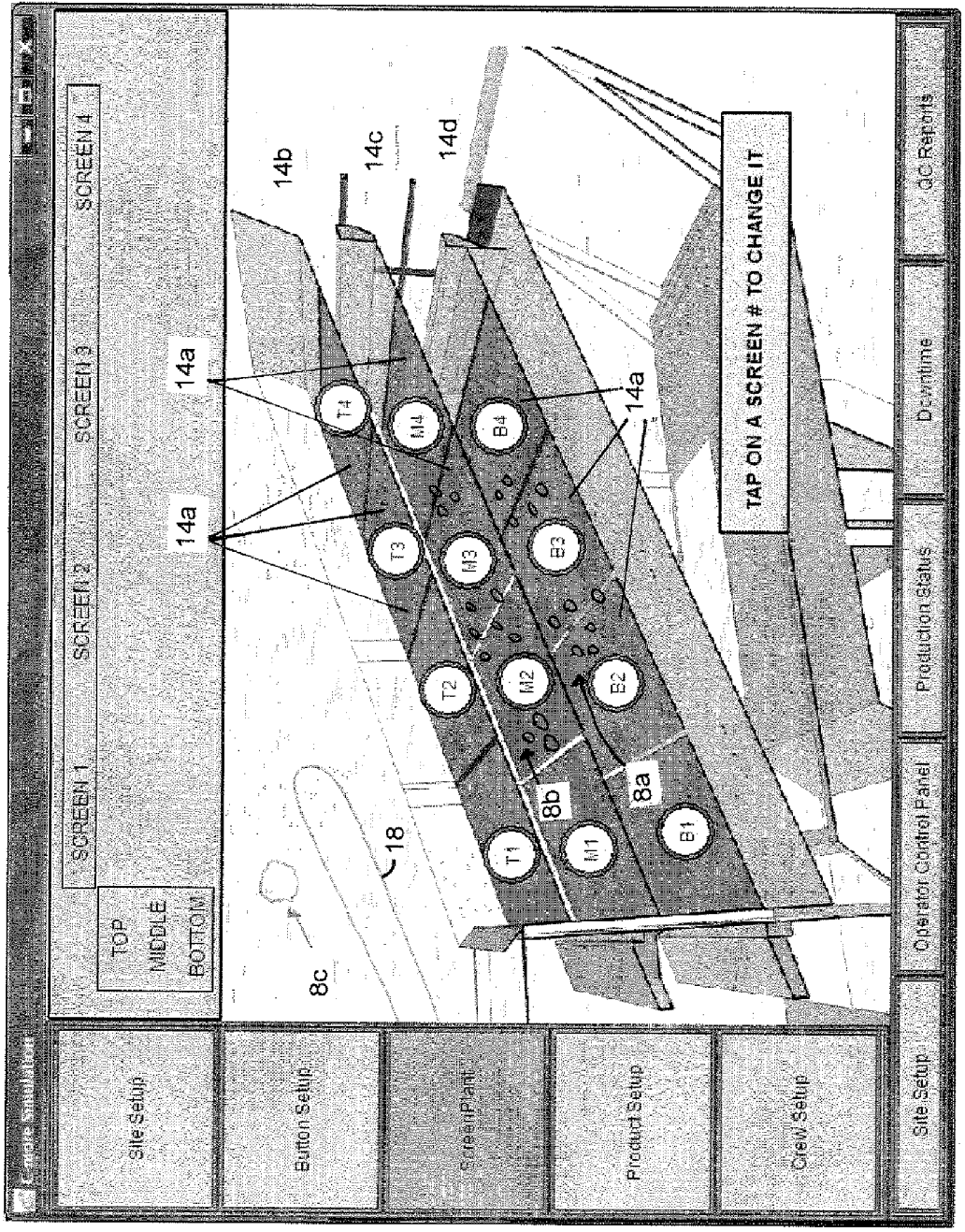
FIG. 2 is the screen deck interface screen from the operator interface system of FIG. 1.

In addition to wear-and-tear on conveyor belts being monitored, other wear items include the screens 14a. The screens are typically replaceable screens used in a stacked formation, for example, three stacked decks as seen in FIG. 2, in order to screen aggregate sizes down to a desired specification and to filter out fines. The use of a vertically stacked array of progressive screen sizes is advantageous as in applicant's experience, maximum efficiency and production is obtained at a substantially 2:1 ratio per screen, although other ratios will work. That is, to obtain for example a production of one inch aggregate 8a, the maximum size aggregate 8b to process or screen is two inches. One example of a stack of screen decks, for use with aggregate 8c which is less than or equal to eight inches in diameter, would employ a three inch aperture size screen on the upper deck 14b, a one inch aperture size screen on the middle deck 14c, below the upper deck, and ⅜-5/16 inch aperture size screen on the lower deck 14d, below the middle deck, to remove fines, etc. Screens may be typically six feet wide by twenty feet long and consequently quite heavy and difficult to change, causing again costly downtime from production if they become damaged. When operating efficiently using the control system according to the present invention, volume production of for example 260 cubic meters (m³) per hour for one inch aggregate and 500 cubic meters per hour of three inch aggregate may be obtained. Advantageously quality control may be monitored every approximately 150 cubic meters of production.

Thus, after arriving at a gravel pit site, and with all machines (feeder, screen, cone, etc) wired and ready to start, the operator configures the site layout in the operator control computer. This is because the control system Programmable Logic Controller (PLC) needs to know the machines that are being used, the sequence in which they are operated, and which control push-buttons are connected to each motor starter. The operator may turn sensors on or off for each machine.

Once the PLC knows the machine order, it can determine the sequencing operations. A push-button could be provided for to the operator console touch screen to put the machine in automatic/manual. Manual mode would return the control to the conventional method of operation. The PLC would still however act as a pass-through, as it is permanently wired to the system.

The touch screen would also have "buttons" for other functionality (machine-computer interaction). The PLC also knows which conveyors have speed sensors (or other sensors) attached so that it can initiate the proper error detection logic.

The operator interface includes a setup interface to detail the operational parameters. In applicant's experience the majority of non-value-added time (for example, downtime/maintenance) is spent on repairing/replacing screens. Detailing the placement, size, and the amount of time that each screen is in use provides feedback to optimize screen management, i.e. use and replacement scheduling. This information may also be useful for quality control (QC) personnel. Long-term data collection may aid in decision making when attempting to meet the desired specification.

The operator interface may have a section to detail the supervisor's log. When instances of stoppage are detected, the operator inputs the reason for the stoppage via drop-down menus containing the most common problems. A section may be provided detailing any parts used, so that reports can be generated to alert the system management if there is a potential shortage of a particular part. This is part of the larger goal of automated resource management.

A timecard procedure may also be automated. On shift startup, the operator inputs the crew members and their respective positions, shift start and end times. The information is tracked automatically by the system. Again, downtimes and the reason for the downtimes are accounted for at time of incidence. A single report may then be generated to the appropriate person, or straight to a central or system management where, monitors and/or management are employed.

Once in aggregate processing and production, the operator has an interface showing the operating conditions. This includes visuals of the machines and their current conditions, for example conveyors running, belt speed, system status, etc. When problem conditions occur the operator is notified as to the problem source and its details. In certain conditions, an auto-sequence shutdown is initiated. With the exception of the cone plant, conveyors may be automatically quickly shut down in order, thus minimizing or eliminating damage to the machinery/belts, or large pileups of aggregate that may occur. Alarms may be configured both visually and audibly to alert the operator of impending failure, blockages, tears in the conveyors, mis-alignment of the conveyors, as would be detected by the sensors described above.

Independent of the operator input, the PLC tracks uptime/downtime by monitoring the feeder, screen and cone motors. Stoppages are tracked to determine actual operation time. Additional input/output data is advantageous, for example knowing the amount of fuel used daily, the speed of the infeed, the output tonnage, the input tonnage, are all parameters that would optimally be used to determine overall production efficiency.

The quality control (QC) operator would advantageously have a QC interface, for example a touch screen. The interface is specific to the needs of the QC personnel. Date and time of test data from QC testing is recorded in real time, and reports are generated therefrom.

Both operator and QC human/machine interface (HMI) consoles are connected to, so as to cooperate with, a central computer. The central computer is connected to, so as to cooperate with, the PLC. The central computer is used to store all data, and may be used to re-configure the PLC or the touch screens. The central computer may also act as a server for remote connections.

What follows is a summary of the various human/machine interfaces used in the control system to interface between the operator and the central computer or server:

Operator Interface:

The operator HMI is a touch screen with graphical display. The screen displays operational conditions, as well as giving the operator the ability to interact with the control system, and input production/maintenance information. Input information is transferred to a server for data storage and reporting. The control system alerts the operator of any operational issues via the touch screen display. What follows are descriptions of the various HMI screens and the corresponding actions taken or done by the PLC:

| | |
|---|---|
| Front End (of HMI) | Site Setup Screen as seen in FIG. 1; Operator Selects either a Dual cone, or single cone setup. More options can be added, for instance when a Jaw is used. |
| HMI | Contain Thumbnails of setup options. Include the most common setups, and may require multiple screens. Once the general setup is determined, operator proceeds to the details screen. This screen contains input parameters, such as the option to change the motor start button on the console, individual conveyor setups, option to enable/disable sensors. |
| PLC | Map known sequences into a word array containing the desired machine startup sequence. A button mapping routine determines which power sources are connected to which corresponding machine motors. |

| | |
|---|---|
| Front End | Production Status Screen(not shown); This screen displays an overview of the processing plant. It shows all the machines placed in sequence, and has indicators that show the status of each machine. Status information includes motors that are on/off, conveyor speeds, and any alarm or problem conditions that exist. This screen may also contain some other basic information as required (production vs. downtime, ect.) |
| HMI | Multiple screens for each setup. The HMI displays the production screen that corresponds with the site setup. Contains motor status information, and displays animations for moving cone, conveyors, screen deck, and material flow. |
| PLC | Manages configuration data to determine site setup and productions values. Does all background calculations relating to runtime, belt speed, and production. |

| | |
|---|---|
| Front End | Screen Deck Screen as seen in FIG. 2; This screen shows a cut-away of the screen deck (or decks) and indicates what size of screen is in each location. This HMI screen includes a method for the operator to input when a screen deck plant screen has been changed out. The screen deck screen change times and utilization information is stored and analyzed for report generation. |
| HMI | Displays the screen deck screens that are currently being used. Keeps a time log of how long each screen has been in use since its last change. Includes a graphical representation of the screen deck screens in their current position. Operator can "change out" virtual screen deck screens by touching them. A pop up window then appears prompting the user to choose a new screen size. |
| PLC | Stores all screen deck screen information. Keeps track of time a screen has been in use. |
| SERVER | Keeps log of screen deck screen usage history. Can be setup to log for each job, for exact costing (for screens, & associated maintenance time). |

Figure 3:
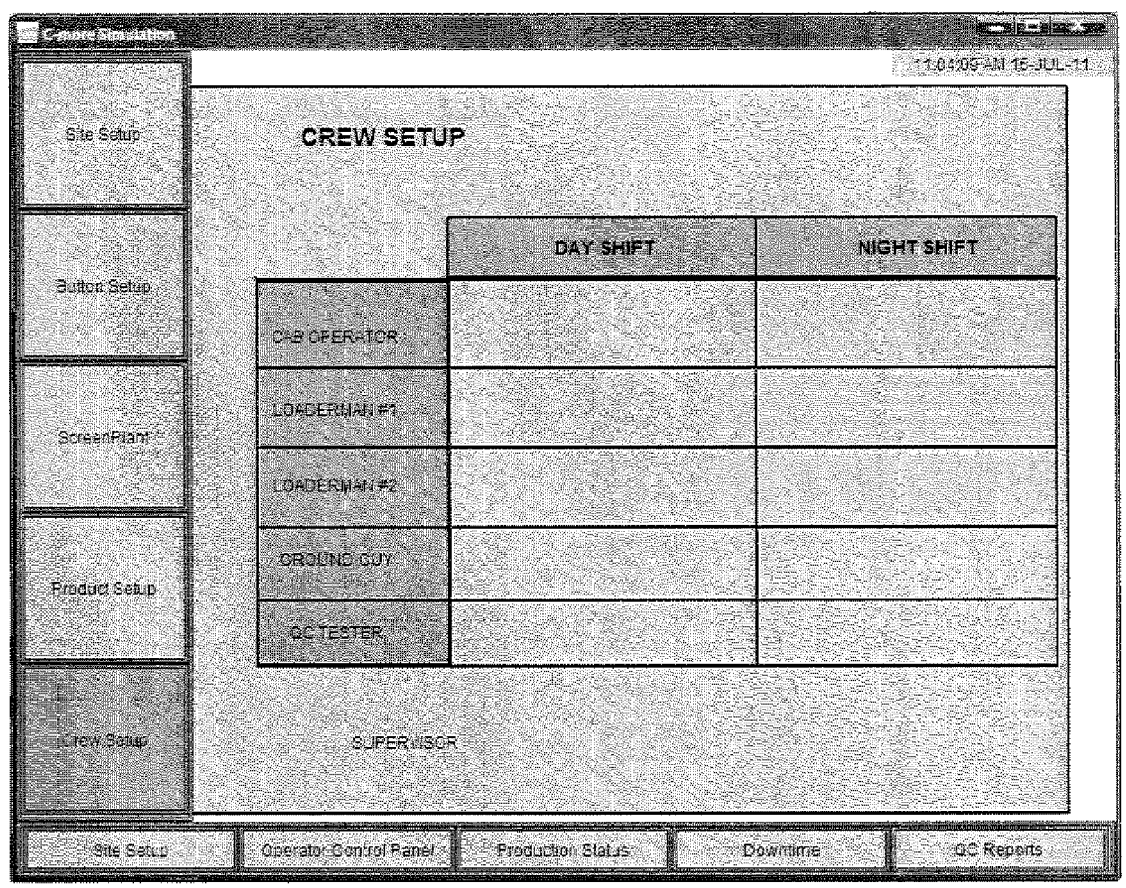
FIG. 3 is the crew setup screen from the user interface system of FIG. 1.

| | |
|---|---|
| Front End | Crew Setup Screen as seen in FIG. 3; This screen is for the shift setups. There are input fields for the various positions (ground-guy, loader man, etc.) as well as the shift time (day/night). |
| HMI | Shows current crew setup. User taps screen to change. |
| SERVER | Stores crew setup history. |

| | |
|---|---|
| Front End | Diagnostics Screen (not shown): This screen is invoked when a malfunction or failure occurs. Its purpose is to identify the cause of the failure. This screen will contain recommendations for the listed failures. |
| HMI | Shows Graphic locating source of problem. Gives text/ numerical details as to the source of the problem. Includes common fixes for the problem (if possible) |
| SERVER | Retain Diagnostic Log |

Figure 4:
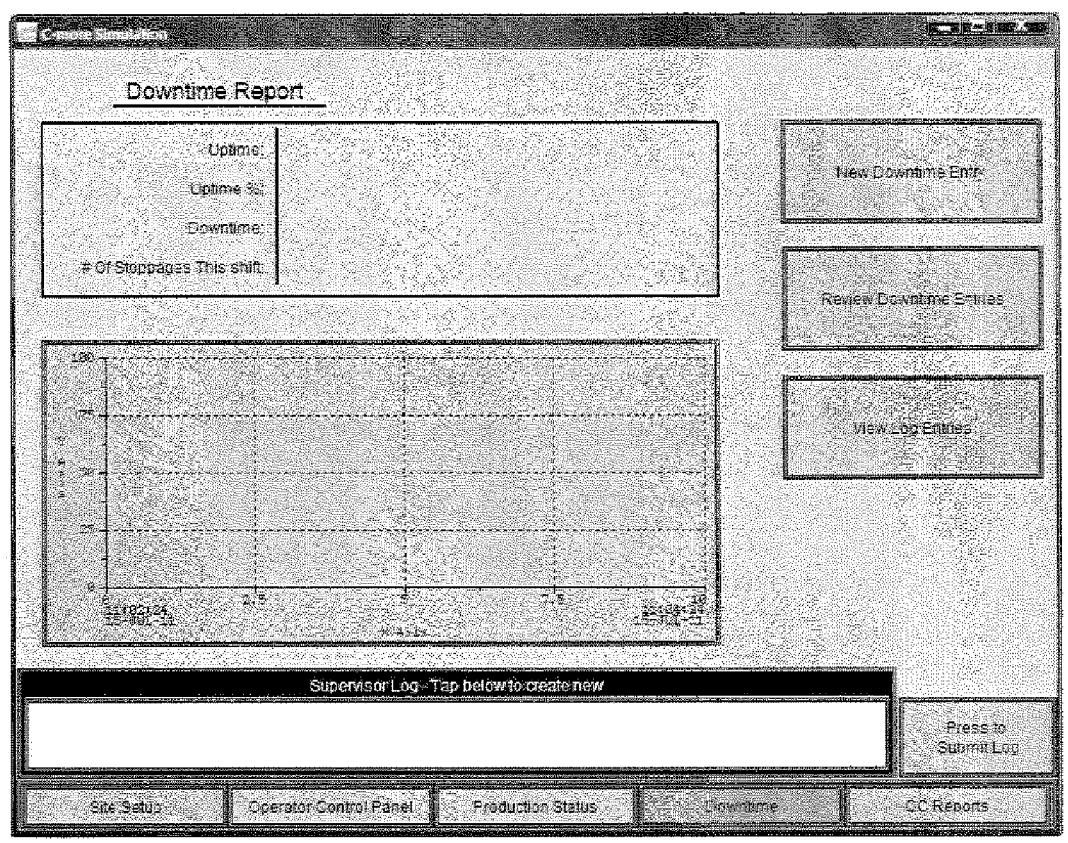
FIG. 4 is the downtime screen of the user interface system of FIG. 1.

| | |
|---|---|
| Front End | Downtime Screen as seen in FIG. 4; Shows downtime information for the current shift. Provides a method for operator to enter downtime reports. When a downtime entry is required, the operator chooses from a list of common problems that caused the downtime. The screen also allows the operator to make notes, just as they currently would in a supervisor log. |
| HMI | Shows uptime percentage of total time, number of stoppages, total downtime per shift. Contains a field to input supervisor logs. Contains a method to submit a new downtime entry. Contains a method to review previous entries. Contains a field to input raw text data from a keyboard, used to store electronic supervisor logs. |
| PLC | Performs all timing and calculation functions. |
| SERVER | Retain Log of production performance history. |

Figure 1A:
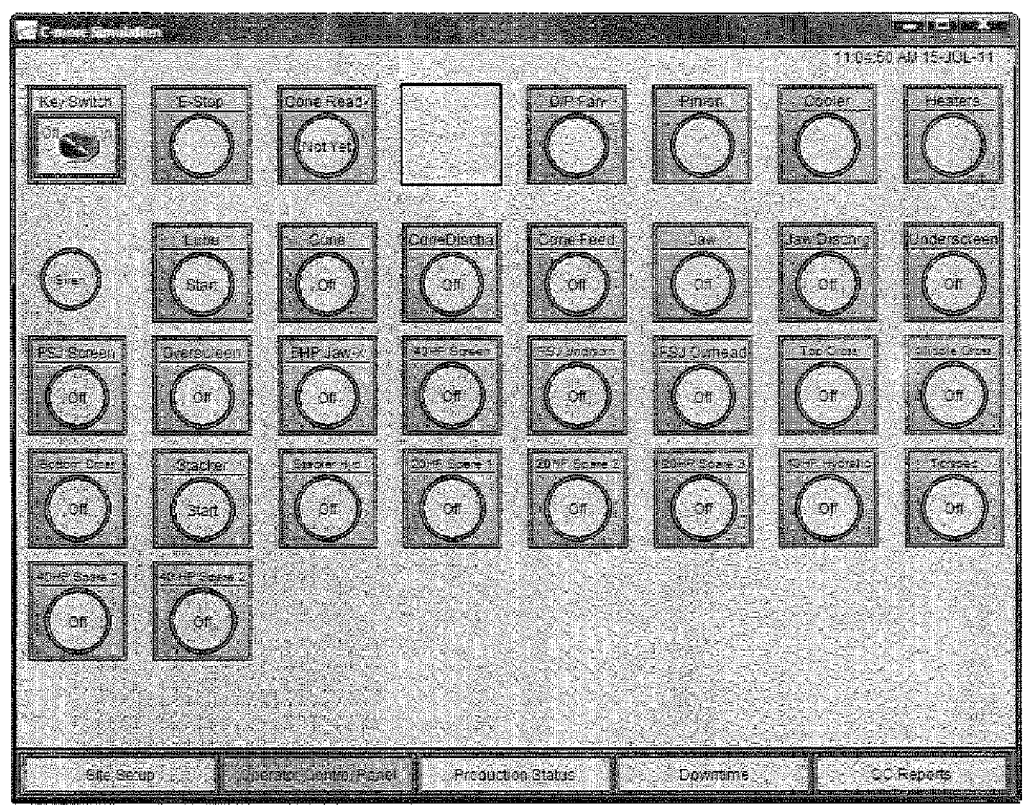
FIG. 1a is the operator control panel screen of the interface system of FIG. 1.

| | |
|---|---|
| Front End | Operator Control Panel Screen as seen in FIG. 1a; Replicates of the physical operator control panel. Contains an array of virtual buttons that behave identically to the real buttons on a control panel. Provides operator a means of switching the system from manual to automatic, and vise-versa. |
| HMI | Looks exactly like a physical panel. Screen contains push buttons with indicators. Contains a button to switch from Auto/Manual, as well as an indicator showing current status. Indicates on/off status. |
| PLC | PLC records when an HMI button request has been made, and determines appropriate action based on the operational status of the machinery. PLC will not go into automatic unless preset criteria are satisfied. PLC may be restricted from turning on a machine on button push due to for example interlocks and motor faults. |

| | |
|---|---|
| Front End | QC Summary Screen (not shown); Operator console displays the most recent QC test results. Also contains a method to review older test reports. This screen is purely status, and the operator cannot change the data. |
| HMI | Displays latest QC report information. Contains a method to summon previous reports for viewing. Displays the current operational parameters that could affect QC. |
| PLC | Does some report trafficking. May perform all data management. |
| SERVER | Stores QC reports. Communicates between locations. Acts as data server. |

QC Interface:

The Quality Control (QC) interface is a touch screen with graphical display. The screen displays some production information, keeps a log of all QC tests done, and has an electronic version of the QC Sheets used. QC test sheets are stored on the local server for later access.

| | |
|---|---|
| Front End | QC Input Screen (not shown); Tester can choose to start a new test, or review previous tests. Displays site information and most recent test results. Shows an estimate of output volume. |
| HMI | Provides a series of screens to input test results from individual tests (weigh, cook, cool, weigh, wash, cook, cool, weigh, sieve). |
| PLC | Stores individual test result numbers. Calculates the overall quality of all output material from a summary of the individual QC tests |
| SERVER | Stores reports. Allows a means for remote access to download reports in real-time (if desired). Timestamps each test as it's performed, and logs person doing each test. |

| | |
|---|---|
| Front End | QC Site Setup Screen; At the start of each product the specifications of the designed aggregate can be entered into the system. This information will be used to setup the QC test reports, i.e.; sieve size, grades and percentages. |
| HMI | Contain input boxes for name and location of site, production quantity and the test criteria to be used. |
| Server | Stores data for later use when returning to a particular site, etc. |

Background Tasks:

There are several background tasks that run continuously between the computing hardware. These tasks provide advanced data management to determine production and QC data, store the data on a local server, provide a method to automate common administrative tasks.

| | |
|---|---|
| Front End | System communications and information management |
| HMI | Provides means of data entry. |
| PLC | A method to infer production data directly from machine operating conditions. Production data is sent to a server database when the appropriate command is given. PLC tag names are coordinated with database field names. This may be accomplished as follows:<br>1.    Create database (DB) first<br>2.    Create PLC tag names based on database field names, prefixed with notation corresponding to the data type in question.<br>3.    Configure Database procedures within database server software. Procedures are the specifics of the database operations to complete.<br>4.    Export Procedures from DB management software.<br>5.    Import Procedures into PLC project.<br>6.    Setup DB request instructions in the PLC code. |
| SERVER | Runs Data Base server software. The server monitors the network for PLC data requests.<br>Data sent from the PLC is stored on the server. Additional software is used to organize the data into the current office formats. Data can also be viewed remotely, and daily DB backups can be automatically sent to the office if desired. |

Plc Program Flow:

| Function | Details |
|---|---|
| Map Buttons | Checks to see if a Console or HMI button is pressed |
| Auto Man Toggle | Check if the Processor is in Auto. If not, Wait for Auto request from HMI or control panel button. Automatic mode can only be achieved when all of the machines are running. A separate routine is used to check machine status. |

| Function | Details |
| --- | --- |
| Check Auto Stops | When the Processor is in Automatic, and a control panel stop push button (PB) or HMI stop is pressed, the automatic shutdown sequence is initiated. This routine determines the stopping sequence, and issues specific "auto stop" commands to each of the motors in the sequence. Cases are defined individually. |
| Cone | Contains all logic pertaining to the cone itself. Manual/Auto starting/stopping, status monitoring, Fault conditions and interlocks.<br>Button Mapping for the Cone is done here. Auto-stop cone is done here. |
| Cone Discharge | Contains all logic pertaining to the cone Discharge. Manual/Auto starting/stopping, status monitoring, Fault conditions and interlocks. Button Mapping for the Cone Discharge is done here. |
| Cone Feed | Contains all logic pertaining to the Cone Feed. Manual/Auto starting/stopping, status monitoring, Fault conditions and interlocks. Button for Cone Feed is done here. |

Figure 9:
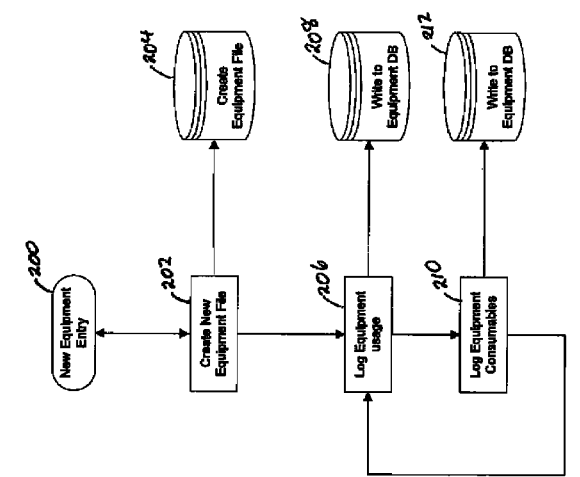
FIG. 9 is a diagrammatic logic flow chart of a further aspect of the maintenance tracking module of FIG. 8.
Figure 8:
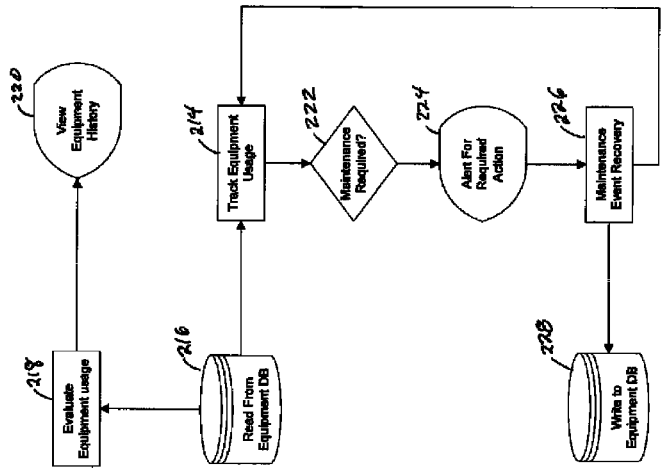
FIG. 8 is a diagrammatic logic flowchart of one aspect of a maintenance tracking module of the control system program.
Figure 12B:
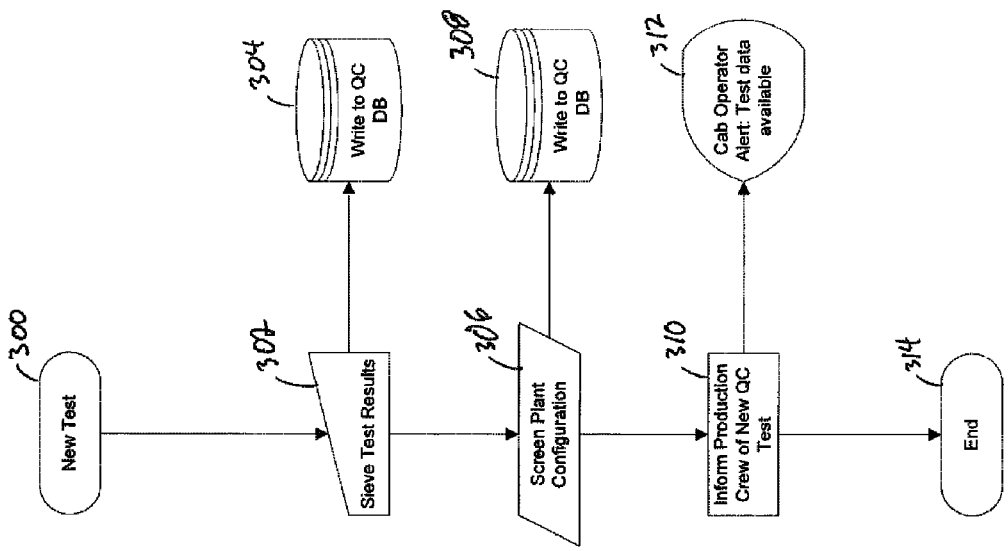
Figure 12A:
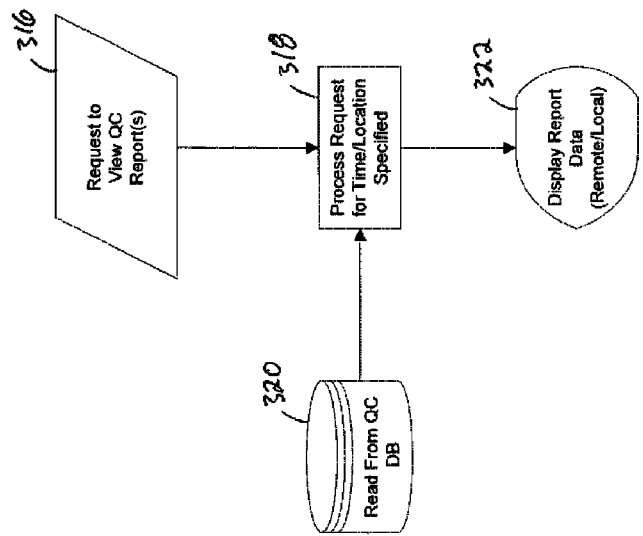
FIG. 12a is a diagrammatic logic flowchart of one aspect of a quality control module of the control system program.

A control system includes an aggregate production control program and that operates a processor and assists managing the operation of the crusher as part of a vertically integrated business providing and/or providing for wad construction and maintenance. Each respective area:

The program includes the following modules, each of which is depicted in the corresponding flow charts in the drawing figures:

FIG. 5—Project File and Data Base, and Production Tracking and Job Costing, including:
Payroll Entry and Submission
Progress Review and Submission
Accounts Payable.
FIG. 6—Systems Start up, including:
Plant Detection Screen (Moveable plant parts)
Remote access and override control for a manager to be able to log in remotely and see exactly what the operator is doing, including being able to see all cone pressures, torspec speed, gen set RPM etc.
FIG. 7—Emergency Detection and Prevention, including:
Belt tracking detection
Belt Stoppage detection
Gen set related issues (lose in RPM etc).
FIGS. 8 and 9—Maintenance (maintenance module includes inventory)
Maintenance module consists of the type of plant and all maintenance parts. All part numbers are data entered
Remote log in for the maintenance department to track inventory and to add inventory
Equipment hours tracking (alert system for oil changes/services).
FIGS. 12a and 12b —Quality Control including:
A link from the QC location to the operator (for example in a tower van) so that data can be sent directly to the operator once it has been entered
Data Base for the Sieve results (this data base will correspond with the type of screens that are on the screen module)
The purpose of the QC module is to track how the processed aggregate product is made with the type of screens used.
FIG. 13—Plant Reconfiguration. Plant reconfigured as necessary to optimize output and to meet pre-determined specification for processed aggregate product.
FIG. 14—Safety:
monitoring of the belt system and belt loads to initiate warnings and subsequent shut down initiation
monitor cone temps and other critical parameters to initiate warning to the operator and also initiate shutdown
Video surveillance for real time and remote monitoring of specific working areas.
The Project Close Out module would include:
Pit close out report
Man hour per cubic meter report
Inventory used
Production Summary
Fuel consumption summary.

With reference to FIG. 5, within the project tracking module of the program at the start of a new project 30, a project file is created at step 32 and stored in data storage 34. Production metrics, are evaluated in step 36 by the processor (not shown) and the data and the results of the evaluation stored in a project database stored in data storage 34. Inventory metrics, are evaluated in step 38 and the data and results of the evaluation stored in the project database. Equipment metrics are evaluated in step 40 and the data and results of the evaluation stored in the project database. Employee metrics are evaluated in step 42 and the data and results of the evaluation stored in the project database.

Upon project close-out at step 44 at the termination or suspension of the project, reports are generated in steps 46, 48, 50, 52 and 54 as to, respectively, equipment cost per cubic meter of product, employee cost per cubic meter of product, inventory, production summary and project close-out.

With reference to FIG. 6, within the auto sequence and event logging module of the program, the processing program is loaded at step 100 and communicates with the plant configuration module of FIG. 13 and the plant monitoring module of FIG. 7. The processing program is started at step 102 where upon the program detects whether automatic mode has been selected or not at step 104. If automatic mode has been selected then the program is started automatically at step 106 following which the program queries whether all of the motors in the plant are running at step 108. If all the motors in the plant are running then the program determines that the system is running at step 110 and commences an error event detection at step 112. If no error event is detected then the program reverts to step 110 and the system is presumed to be running properly. In the event that an error event is detected at step 112, then the operator is alerted at step 114 and a decision is made at 116 whether an emergency stop of the system is required. If no emergency stop is required then the error event is logged to the database at step 118 and the program returns to step 110, that is, that the status of the system is that it is running. If it is determined in step 116 that an emergency stop is required, then an automatic shut down sequence is commenced in step 120 so as to stage the shutdown of the conveyors, cone plant, etc. The automatic shutdown event is then logged to the database in step 122 and the decision is made in step 124 whether the automatic shutdown is to be aborted. If the automatic shutdown is not aborted then the program returns to awaiting a restart in step 102. If the automatic shutdown is aborted then the program switches from the automatic mode selected in step 104 to manual system actuation in step 126.

In step 104 if automatic mode was not selected then the program switches to manual actuation in step 126. In manual mode the operator manually actuates the various motors and in the event that a system stop is required in step 128 the program ends in step 130. During system running in manual mode, if an event is detected in step 132 then the event is logged to the database in step 134 and the program returned to restart in step 102.

With reference to FIG. 7, within the automatic monitoring and control module of the program within the auto sequencing module of FIG. 6, the sensors described above provide for tracking of the conveyor belts in step 140 and for tracking of belt rotation in step 142. The generator set is monitored in step 144, and plant operational data is monitored in step 146. Within the monitoring of steps 140, 142, 144, and 146, evaluations for error conditions is done in step 148. In the event that an error event is detected at step 150 then an error handling routine is employed at step 152, and the program module iterated to continuing the monitoring in steps 140-146. In the event that no error event is detected in step 150, the module is iterated to continue the monitoring in steps 140-146.

With reference to FIG. 8, within the maintenance tracking module of the program, the identification of new equipment is entered in step 200 and a corresponding new equipment file created in step 202. The new equipment file is written to the database in step 204. Equipment usage is logged in step 206 and recorded to the database in step 208. The equipment consumables, for example, fuel usage, etc, are logged in step 210 and written to the database in step 212. The program iterates between step 210 and step 206 as equipment and consumables are used.

With reference to FIG. 9, within the maintenance tracking module of the program, the equipment usage which is logged in step 206 in FIG. 8, is also tracked in step 214 in FIG. 9. The tracking of equipment usage in step 214 is based on data read from the database in step 216, which data is also used to evaluate equipment usage in step 218. The result of the evaluation in step 218 may be viewed in step 220.

From the tracking of equipment usage in step 214, the module determines if maintenance of the equipment is required in step 222, and if maintenance is required then an alert to the operator is performed in step 224. Any maintenance event in step 226 is recorded and written to the equipment database in step 228. The program module iterates from step 226 to step 214.

Figure 11:
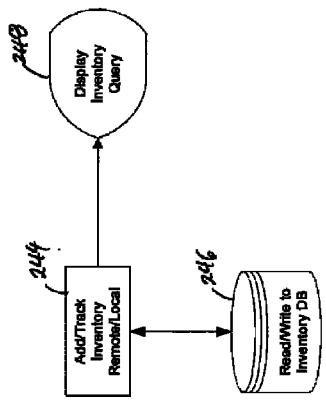
FIG. 11 is a diagrammatic logic flowchart of a further aspect of the inventory tracking module of FIG. 10.
Figure 10:
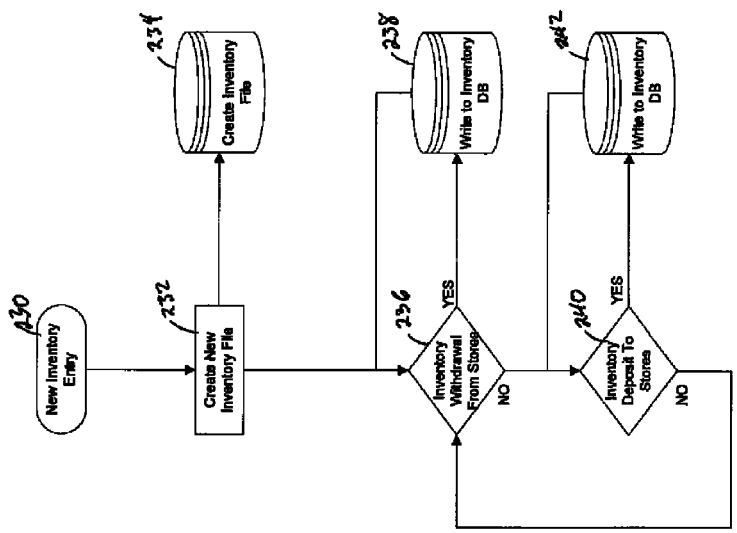
FIG. 10 is a diagrammatic logic flowchart of an inventory tracking module of the control system program.

With reference to FIG. 10, within the inventory tracking module of the program, similar to the recording and tracking of new equipment in the maintenance tracking module, the identity of new inventory is entered in step 230 and a corresponding new inventory file created in step 232. The new inventory file is recorded in the database in step 234. At step 236 if inventory is withdrawn from stores then the withdrawal of inventory is recorded in the inventory database in step 238. If instead, inventory is deposited to the stores in step 240 then the deposit of the stores is recorded to the inventory database in step 242. The program module iterates from step 240 to step 236. FIG. 11 illustrates diagrammatically that the inventory may be added to and/or tracked either remotely or locally in step 244, and that an inventory query of the database in step 246 may be displayed in step 248.

With reference to FIG. 12a, within the quality control module of the control system program, a new quality control test is performed in step 300 and the sieve test results recorded in step 302 and written to the quality control database in step 304. The sieve test results in step 302 are correlated to a particular screen plant configuration in step 306, which screen plant configuration was used to generate the sieve test results of step 302, and the screen plant configuration is also written to the quality control database in step 308. The production crew is informed of the new quality control test from step 300 in step 310, and the operator alerted to the availability of new test data in step 312. The quality control module is ended in step 314. As seen in FIG. 12b, when a request to view quality control reports is received in step 316, the request is processed in step 318, and the data read from the quality control database in step 320. The corresponding report is then generated and displayed in step 322.

With reference to FIG. 13, within the plant configuration module of the control system program the plant configuration module is called from the auto sequencing module of FIG. 6 and if it is determined in step 140 that the plant configuration is to be changed then the configuration change request is sent locally and or remotely in step 142. The procedure for the configuration change is view locally and or remotely in step 144 and the change request is processed in step 146. The configuration change is performed as a reconfiguration in step 148 and the module iterated to step 140. In the event that no plant configuration change is called for in step 140, the module iterates so as to monitor for a change of plant configuration request from the auto sequencing module.

Figure 14B:
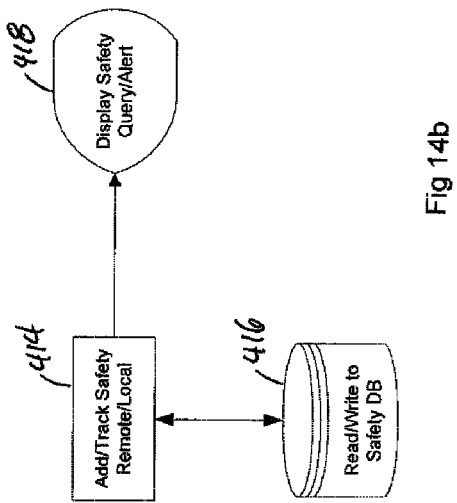
Figure 14A:
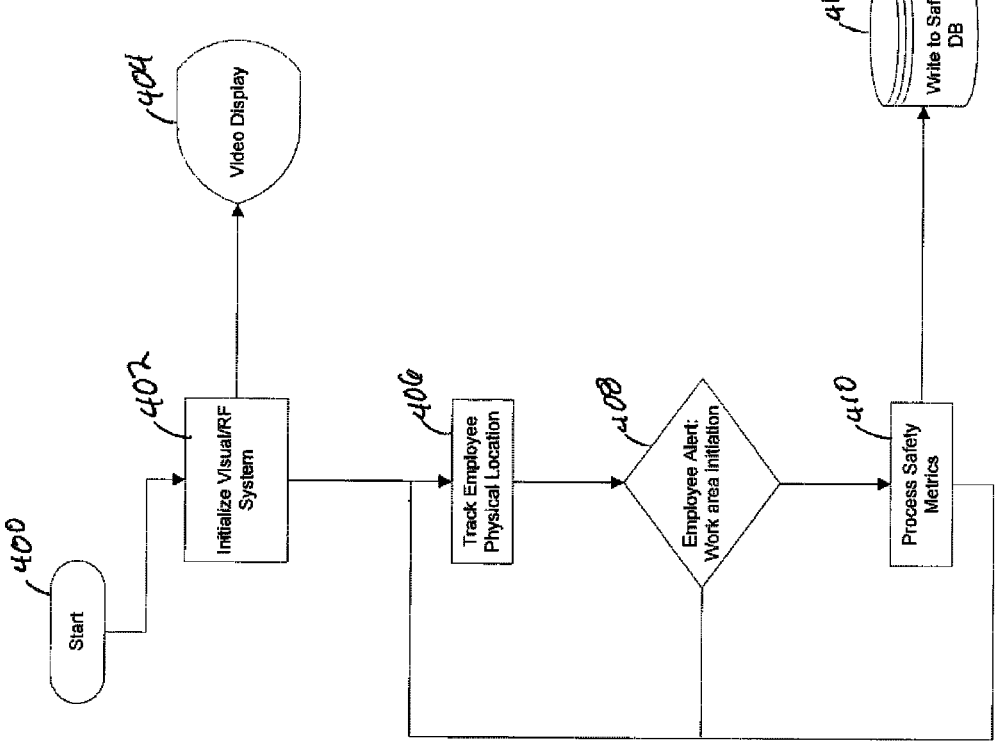
FIG. 14a is a diagrammatic logic flowchart of one aspect of a safety monitor module of the control system program.

With reference to FIG. 14a, within the safety monitor module of the control system program, upon commencement of the module in step 400 the visual or radio frequency monitoring system to monitor for example employee location around the plant, is initialized in step 402 and the monitoring displayed in step 404. The tracking of the physical location of employees is performed in step 406. Employees are alerted the plant is being initiated in step 408. Safety metrics are processed in step 410 and written to the safety database in step 412.

The module iterates between steps 408 and 406, and between steps 410 and 406. As seen in FIG. 14b, the adding or tracking of safety monitoring may be done remotely and or locally in step 414. The safety monitoring data is read from and written to the safety database in step 416. The results of the safety query and or alert are displayed in step 418.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of operating an aggregate processing plant to provide processed aggregate to a pre-determined specification within a particular gravel pit, the method comprising the steps of:
within said particular gravel pit,
   a) providing a feed hopper,
   b) providing at least a first screen plant having a corresponding configuration and cooperating with said feed hopper, c) providing a first conveyor set cooperating with said first screen plant for conveying screened aggregate from said first screen plant, d) providing a first aggregate processor cooperating with said first conveyor set and downstream of said screen plant in a direction of flow of said screened aggregate on said first conveyor, wherein said first screen plant has a multi-layer screen deck having removable screens from each layer of said screen deck, each said screen in each said layer having a corresponding aperture size for separating said screened aggregate based on said aperture size, said screens and corresponding said aperture sizes in said screen deck providing said configuration of said first screen plant, e) providing conveyor sensors cooperating with said first conveyor set for detecting at least one of: conveyor velocity, conveyor mis-alignment, conveyor damage, conveyor blockage, f) providing a processor and a control system, wherein said processor includes computing means, a PLC, and data storage, and wherein said control system cooperates with, so as to regulate operation of and inter-operability between, said feed hopper, said first conveyor set, said first screen plant, and said first aggregate processor, said control system communicating with said sensors and with said processor for operation of said aggregate processing plant to optimize through-put of screened and processed aggregate, and recording said throughput as throughput data and said specification as specification data in said data storage, wherein said control system includes a quality control method comprising the further steps of:

g) obtaining a sample of said screened and processed aggregate from downstream of said first aggregate processor, h) performing sieve testing of said sample to obtain corresponding test results, i) comparing said test results to said specification to determine any deviation from said specification, j) then, if said deviation falls outside of an acceptable deviation-from-specification range, adjusting said configuration of said first screen plant, k) repeating steps g)-j) until said deviation falls within said acceptable deviation-from-specification range, l) recording said corresponding configuration of said first screen plant as configuration data in said data storage for later retrieval of at least corresponding said throughput, specification and configuration data upon a subsequent operation of said method in said particular gravel pit.

2. The method of claim 1 further comprising the steps of:

a) receiving a request to submit a bid on a proposed roadwork in a particular location, wherein said roadwork requires processed aggregate according to a particular specification, b) locating said data from said data storage of a proximate gravel pit which is proximate to said particular location of said proposed roadwork, wherein said proximate gravel pit is one of said particular gravel pits having said data in said data storage, and wherein said particular specification corresponds to said specification data in said data storage associated with said particular gravel pit, c) using said throughput, specification and configuration data to formulate said bid for said proposed roadwork.

3. An aggregate processing plant for processing aggregate to a pre-determined specification within a particular gravel pit, the plant comprising:

a) a feed hopper, b) at least a first screen plant having a corresponding configuration and cooperating with said feed hopper, c) a first conveyor set cooperating with said first screen plant for conveying screened aggregate from said first screen plant, d) a first aggregate processor cooperating with said first conveyor set and downstream of said screen plant in a direction of flow of said screened aggregate on said first conveyor, wherein said first screen plant has a multi-layer screen deck having removable screens from each layer of said screen deck, each said screen in each said layer having a corresponding aperture size for separating said screened aggregate based on said aperture size, said screens and corresponding said aperture sizes in said screen deck providing said configuration of said first screen plant, e) conveyor sensors cooperating with said first conveyor set for detecting at least one of: conveyor velocity, conveyor mis-alignment, conveyor damage, conveyor blockage, f) a processor and a control system, wherein said processor includes computing means, a PLC, and data storage, and wherein said control system cooperates with, so as to regulate operation of and inter-operability between, said feed hopper, said first conveyor set, said first screen plant, and said first aggregate processor, said control system communicating with said sensors and with said processor for optimized operation of said aggregate processing plant to optimize through-put of screened and processed aggregate, and recording said throughput as throughput data and said specification as specification data in said data storage, wherein said control system includes a quality control module comprising:

g) comparing test results from sieve testing of a sample of said screened and processed aggregate from downstream of said first aggregate processor, to said specification to determine any deviation from said specification, h) then, if said deviation falls outside of an acceptable deviation-from-specification range, prompting adjusting said configuration of said first screen plant, i) prompting repeating steps g)-h) until said deviation falls within said acceptable deviation-from-specification range, j) recording said corresponding configuration of said first screen plant as configuration data in said data storage for later retrieval of at least corresponding said throughput, specification, and configuration data upon a subsequent operation of said plant in said particular gravel pit.

4. A method of operating an aggregate processing plant to provide processed aggregate to a pre-determined specification within a particular gravel pit, wherein the plant includes:

a) a feed hopper, h) at least a first screen plant having a corresponding configuration and cooperating with said feed hopper, c) a first conveyor set cooperating with said first screen plant for conveying screened aggregate from said first screen plant, d) a first aggregate processor cooperating with said first conveyor set and downstream of said screen plant in a direction of flow of said screened aggregate on said first conveyor, wherein said first screen plant has a multi-layer screen deck having removable screens from each layer of said screen deck, each said screen in each said layer having a corresponding aperture size for separating said screened aggregate based on said aperture size, said screens and corresponding said aperture sizes in said screen deck providing said configuration of said first screen plant,
- e) conveyor sensors cooperating with said first conveyor set for detecting at least one of conveyor velocity, conveyor mis-alignment, conveyor damage, conveyor blockage,
- f) a processor and a control system, wherein said processor includes computing means, a PLC, and data storage, and wherein said control system cooperates with, so as to regulate operation of and inter-operability between, said feed hopper, said first conveyor set, said first screen plant, and said first aggregate processor, said control system communicating with said sensors and with said processor for optimized operation of said aggregate processing plant to optimize through-put of screened and processed aggregate, and recording said throughput as throughput data and said specification as specification data in said data storage, wherein said method comprising the steps of:
- g) obtaining a sample of said screened and processed aggregate from downstream of said first aggregate processor,
- h) performing sieve testing of said sample to obtain corresponding test results,
- i) comparing said test results to said specification to determine any deviation from said specification,
- j) then, if said deviation falls outside of an acceptable deviation-from-specification range, adjusting said screen plant,
- k) repeating steps g)-j) until said deviation falls within said acceptable deviation-from-specification range,
- l) recording said corresponding configuration of said first screen plant as configuration data in said data storage for later retrieval of at least corresponding said historical records upon a subsequent operation of said method in said particular gravel pit.

5. The method of claim 4 further comprising the steps of:
- a) receiving a request to submit a bid on a proposed roadwork in a particular location, wherein said roadwork requires processed aggregate according to a particular specification,
- b) locating said data from said data storage of a proximate gravel pit which is proximate to said particular location of said proposed roadwork, wherein said proximate gravel pit is one of said particular gravel pits having said data in said data storage, and wherein said particular specification corresponds to said specification data in said data storage associated with said particular gravel pit,
- c) using said throughput, specification and configuration data to formulate said bid for said proposed roadwork.

6. The method of claim 1 wherein said control system includes an emergency staged shutdown which, upon detection of emergency conditions by said sensors, stages an automatic shutdown of at least said conveyors and said first aggregate processor to minimize damage and backup of said flow of said aggregate.

7. The method of claim 1 further comprising providing a second screen plant, a second conveyor set, and a second aggregate processor cooperating with one another and with said first screen plant, said first conveyor set, and said first aggregate processor to provide said processed aggregate which is of a finer size than from said aggregate processor crusher.

8. The method of claim 7 wherein said control system monitors said sensors and upon detection of at least one fault by said sensors commences said shutdown.

9. The method of claim 8 wherein said control system monitors and evaluates metrics chosen from the group of metrics comprising: production metrics, inventory metrics, equipment metrics, employee metrics.

10. The method of claim 9 wherein said control system produces reports chosen from the group of reports comprising: equipment and equipment consumable cost per cubic meter of said processed aggregate produced, employee cost per cubic meter of said crushed aggregate product, a production summary.

11. The method of claim 2 further comprising returning to said particular gravel pit which is said proximate gravel pit for said proposed roadwork and performing therein the method of claim 1.

\* \* \* \* \*